Sept. 1, 1959 W. W. HOHENNER 2,902,273
NON-LINEAR SHOCK ABSORBER
Filed June 27, 1958
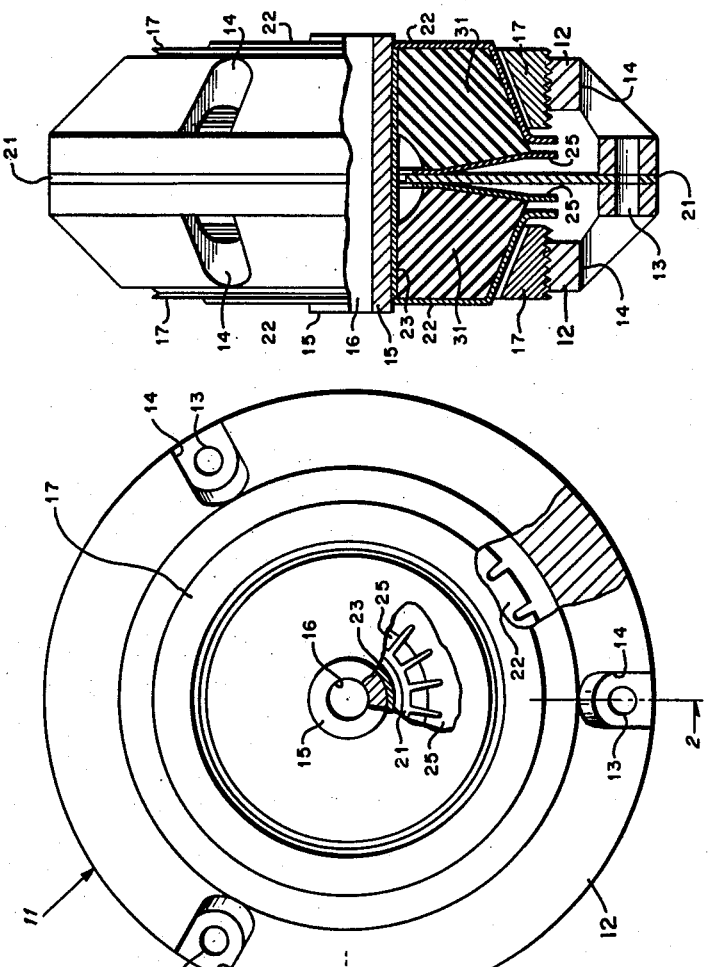
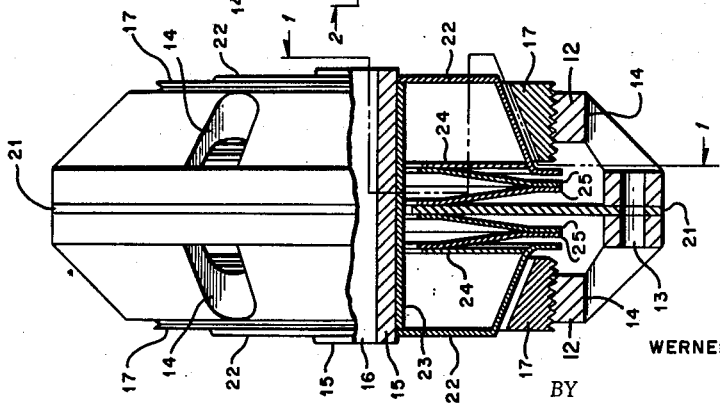
INVENTOR.
WERNER W. HOHENNER
BY
ATTORNEYS

United States Patent Office 2,902,273
Patented Sept. 1, 1959

2,902,273

NON-LINEAR SHOCK ABSORBER

Werner Wilhelm Hohenner, Adelphi, Md.

Application June 27, 1958, Serial No. 745,227

7 Claims. (Cl. 267—1)

(Granted under Title 35, U.S. Code (1952), sec. 266)

The invention described herein may be manufactured and used by or for the Government of the United States of America for governmental purposes without the payment of any royalties thereon or therefor.

This invention relates to a non-linear shock absorber, and more particularly to a non-linear shock absorber including a combination of non-linear spring elements supported by means movable to provide adjustable damping, so that this shock absorber is suitable for use in supporting diverse equipment under widely varying operating conditions.

A wide variety of shock absorbing and vibration damping assemblies have been developed to provide suitable protective support for various types of relatively delicate equipment which must be installed for service under adverse operating conditions as in aircraft, for example, where such equipment is subject to diverse shock loads as well as to severe vibration loads which may vary under different operating conditions. The wide variations in the size and mass of such equipment as well as in the environmental conditions to which it is subjected has characteristically required a wide variety of shock mounting means to provide suitable support for various equipments under various operating conditions, since most such mounting means are not adjustable and hence are suitable for only a limited number of different applications within the relatively narrow range of performance capabilities for such size or type of mounting means.

In contrast to the inherent limiting characteristics of various existing shock mounting means, the instant invention contemplates a non-linear shock absorber assembly which consists of a combination of non-linear spring elements with various and adjustable spring constants which are supported in an operative relationship by means providing adjustable damping for the respective spring elements.

An object of the instant invention is the provision of a novel non-linear shock absorber assembly incorporating a plurality of spring elements so disposed that the spring constants as well as the damping of the spring elements can be changed.

An object of this invention is to provide a novel non-linear shock absorber assembly arranged so that the resonant frequency of a spring-mass system including shock absorber assemblies and equipment supported thereby can be shifted to a desired value within a fairly wide range to provide the best possible protection of the equipment so supported.

Still another object is the provision of a novel shock absorber assembly arranged to prevent excessive amplitude of displacement of a spring-mass system including such shock absorber assemblies if the system is excited at its natural frequency.

Yet another object is to provide a novel shock absorber assembly with a high resistance to overload conditions and a minimized danger of impact shock due to such overload conditions.

Other objects and advantages of the instant invention will become apparent upon consideration of the following description along with the showing in the accompanying drawings wherein:

Fig. 1 is a plan view, partially broken away on section line 1—1 of Fig. 2, of a preferred embodiment of the instant invention, Fig. 2 is a side view sectioned on line 2—2 of Fig. 1, of the same embodiment of the instant invention, and Figure 3 is a similar side view, similarly sectioned, of a modification of the device comprising the instant invention.

Referring now to the drawings wherein like reference numerals refer to like or corresponding parts, Fig. 1 shows the non-linear shock absorber assembly of the instant invention generally designated by the reference numeral 11 and including a pair of substantially identical opposed annular frame members 12, one of which is visible in Fig. 1, having a plurality of spaced attachment holes 13 and suitable peripheral recesses 14 arranged to accommodate suitable attachment means such as bolts, rivets, or the like for securing the frame members 12 to a supporting means therefor such as an airframe or a suitable support mounted within an aircraft. Fig. 1 also shows an elongated hollow tubular member 15 having a central opening 16 therethrough and disposed concentrically of the annular frame members 12 to accommodate a through bolt or other suitable attachment means for engagement to an equipment to be supported by the shock absorber assembly 11. Fig. 1 also shows one of a pair of substantially identical externally threaded annular spring element supporting rings 17 threadably engaged with an internally threaded surface of the adjoining frame member 12. Finally, Fig. 1 shows small portions of the inner or outer edges of various spring elements incorporated in the instant invention to indicate the manner in which the edges of these annular spring elements may be radially slotted or notched adjacent the edges thereof.

Turning next to Fig. 2, the respective opposed annular frame members 12 are shown disposed on opposite sides of an intermediate rigid disc forming a central membrane 21 in the shock absorber assembly 11. The concentrically disposed elongated hollow tubular member 15 is shown projecting through the central membrane 21 and beyond an opposed pair of cupped spring elements 22 having tapered circumferential surfaces for engagement with and support by the cooperating corresponding tapered inner surfaces of the rings 17 and terminating in peripheral flanges one of which is shown, in part, in Fig. 1. The cupped spring elements 22 are spaced apart a predetermined fixed distance at their centers by a hollow sleeve 23 encircling the hollow tubular member 15 and engaging the respective spring elements 22 adjacent to the central openings therethrough for accommodation of the hollow tubular member 15. Moreover, each of the cupped spring elements 22 is closed by a flat annular member 24 engaging the circumferential tapered wall of each spring element 22 adjacent to the peripheral flange projecting therefrom. Finally, each cupped spring element 22 is positioned relative to the central membrane 21 by a pair of similar opposed annular spring elements 25 having substantially planar outer flanges in mutual sliding engagement and substantially planar inner flanges in sliding engagement with the central membrane 21 and the flat annular member 24, respectively.

While no means is specified for securing the respective annular frame members 12 to the central membrane 21, it is to be understood that such attachment, as by welding or riveting, or the like is contemplated to facilitate handling of this assembly pending its attachment to supporting means by the insertion of bolts or the like through the openings 13 provided for this purpose.

In operation, a suitable number of the non-linear shock absorber assemblies 11 disclosed herein are fixedly secured to a suitable support therefor by the insertion of attachment bolts or the like through the openings 13 and thence through the adjoining supporting structure. An equipment to be supported by this plurality of shock absorber means is secured thereto by through bolts inserted through the elongated hollow tubular member 15 of each shock absorber assembly. Taking into account the nature of the equipment thus supported and the anticipated operating conditions, the respective annular rings 17 may be adjusted by rotation of these rings relative to the respective frame members 12 with which they are threadably engaged to achieve the desired characteristics of the respective spring elements with respect to the constants thereof and to the damping imposed thereon. Thereafter, various shock absorber assemblies act to screen the equipment supported thereby from various vibration loads and shock loads to which the supporting means therefor may be subjected.

Where substantially increased internal damping is required, the modification of the instant invention illustrated in Fig. 3 may be used. In this embodiment the respective annular members 24 engaging the respective cupped spring elements 22 are replaced by annular members 31 of resilient material such as rubber or the like shaped as shown in Fig. 3 to fill the space defined by the respective cupped spring elements 22 and by the cooperating sleeve 23. In addition, the outermost of each pair of the substantially identical spring elements 25 may be eliminated by shaping the respective annular members 31 of resilient material to engage the respective remaining annular spring elements 25 in the manner illustrated in Fig. 3.

In operation, the embodiment of the instant invention illustrated in Fig. 3 is mounted and adjusted for use in the same manner as described for the embodiment illustrated in Figs. 1 and 2, except that the embodiment illustrated in Fig. 3 is characterized by substantially greater internal damping characteristics due to the presence of the annular members 31 of resilient material shown therein.

While the respective spring elements 25 of each pair have substantially identical configurations, they may have substantially different spring characteristics due to the use of different materials, different processing or different edge configurations. In fact, the range of adjustability of the instant invention can be extended by disassembling the rings 17 from the frame members 12 to substitute spring elements having different spring characteristics for any of the various spring elements 21 or 25.

When the rings 17 have been properly positioned to secure the desired characteristics for a given application of the shock absorber assembly 11, they may be secured by priming the edge or by other suitable restraining means.

Thus, the instant invention provides a non-linear shock absorber assembly which is compact and of relatively simple construction yet embodies means for facilitated adjustment of the assembly over a relatively wide range to accommodate various different equipments under different operating conditions.

Obviously many modifications and variations of the present invention are possible in the light of the above teachings. It is therefore to be understood that within the scope of the appended claims the invention may be practiced otherwise than as specifically described.

What is claimed is:

1. A shock absorber assembly comprising a flat rigid intermediate disk, a pair of substantially identical annular frame members disposed in opposed relation on opposite sides of said disk, a plurality of non-planar annular spring elements disposed on each side of said disk and encircled by one of said frame members, and annular spring element retaining means in adjustable engagement with each said frame member to maintain the adjoining spring element in mutual sliding engagement.

2. A device as described in claim 1, wherein the spring element adjacent to said retaining means has a tapered circumferential surface and said retaining means has a coacting inner tapered surface, whereby the retaining means may be positioned to adjust the damping of the shock absorber assembly.

3. A device as described in claim 1, wherein each plurality of non-planar annular springs includes a pair of substantially identical shallow dished spring elements disposed in opposed relationship, and a deeply cupped spring element having a tapered circumferential surface engaging said retaining means and including a flat annular member closing said cupped spring element and engaging one of said shallow dished spring elements.

4. A device as described in claim 1, wherein each plurality of non-planar annular springs includes a shallow dished spring element and a deeply cupped spring element disposed in opposed relationship, and, in addition, a resilient annular member shaped to substantially fill the space between said shallow dished spring element and said deeply cupped spring element.

5. A non-linear shock absorber assembly comprising a central circular generally planar rigid membrane having a central opening therethrough, an elongated supporting means extending through the opening in said membrane, a pair of substantially identical annular frame members secured in opposed relation on opposite sides of said membrane, a plurality of planar and non-planar annular spring elements disposed in mutual sliding engagement on each side of said membrane encircling said supporting means and encircled by one of said frame members, and an annular spring element supporting ring threadably engaged with each said frame member and adjustable to bias the adjoining spring elements into mutual engagement with a variable damping effect dependent upon the adjustment of said ring.

6. A device as described in claim 5, wherein each said supporting ring has a tapered inner surface and each plurality of planar and non-planar annular springs includes a pair of similarly shaped shallow dished spring elements disposed in opposed relation, a deeply cupped spring element having a tapered circumferential surface, and a flat annular member closing said cupped spring element and engaging one of said shallow dished spring elements, and each of the several spring elements of each plurality thereof having a different spring constant.

7. A device as described in claim 5, wherein each plurality of planar and non-planar annular springs includes a shallow dished spring element sloping away from said membrane toward the periphery thereof, a deeply cupped spring element extending toward said membrane adjacent the periphery of said cupped spring element, and a resilient annular member shaped to substantially fill the space between said shallow dished spring element and said deeply cupped spring element.

References Cited in the file of this patent

UNITED STATES PATENTS

| | | |
|---|---|---|
| 2,232,667 | Saurer | Feb. 18, 1941 |
| 2,660,423 | Roy | Nov. 24, 1953 |

FOREIGN PATENTS

| | | |
|---|---|---|
| 459,458 | Italy | Sept. 12, 1950 |